March 20, 1951 W. F. LANGENFELD 2,545,887
TRACTOR CHAIN
Filed July 1, 1949
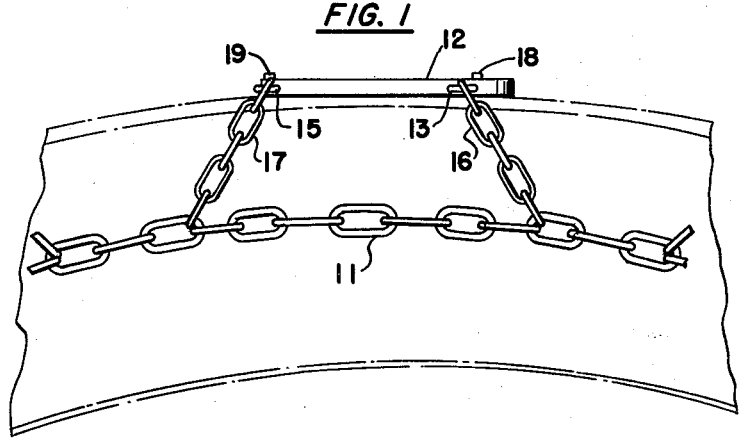
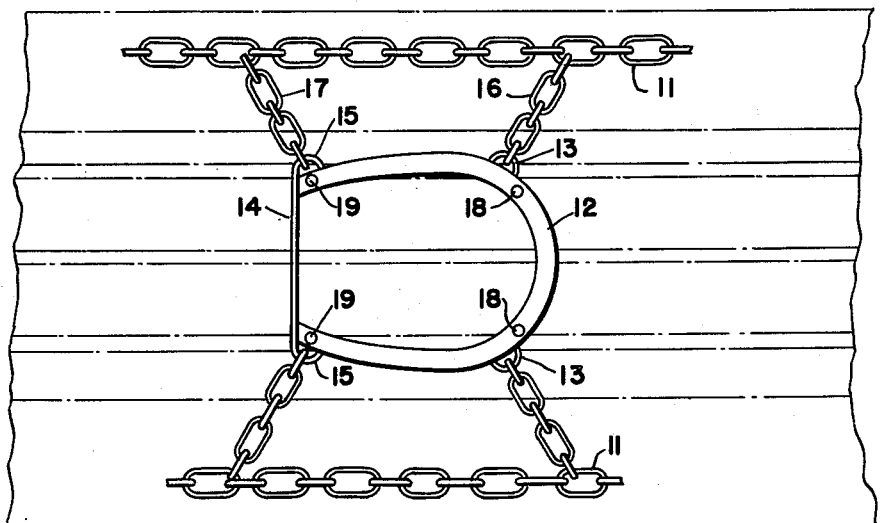
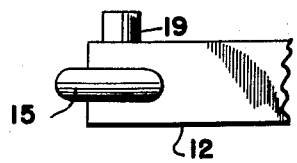
INVENTOR.
WILLIAM F. LANGENFELD
BY
McMorrow, Berman + Davidson
ATTORNEYS Patented Mar. 20, 1951

2,545,887

UNITED STATES PATENT OFFICE 2,545,887

TRACTOR CHAIN

William F. Langenfeld, Earling, Iowa

Application July 1, 1949, Serial No. 102,619

1 Claim. (Cl. 152—229)

This invention relates to anti-skid devices for vehicles, and more particularly to a chain device of the antiskid type for use on tractor tires, truck tires, and on similar vehicles.

A main object of the invention is to provide a novel and improved anti-skid chain for use on tractors and other vehicles, said chain being very simple in construction, providing positive ground-gripping action, and being very simple to install.

A further object of the invention is to provide an improved anti-skid chain element for use on tractor wheels and the like which is very inexpensive to manufacture, which is very rugged in construction, and which involves very simple components.

Further objects and advantages of the invention will become apparent from the following description and claim, and from the accompanying drawings, wherein:

Figure 1 is a fragmentary side elevational view of a tractor tire showing a portion of an anti-skid chain constructed in accordance with the present invention mounted thereon;

Figure 2 is a top plan view of the anti-skid chain portion of Figure 1 shown mounted on the tractor tire;

Figure 3 is an enlarged fragmentary side elevational view of the end portion of the ground-engaging element of the skid chain of Figures 1 and 2.

Referring to the drawings, 11, 11 designate respective side chains, similar to the side chains of conventional automobile anti-skid chain devices. Designated at 12 is an intermediate member, which may be a conventional horseshoe. Member 12 has secured to its forward side portions the respective eye elements 13, 13 and has welded or otherwise rigidly secured to its rear ends a transverse bar member 14 whose ends are curved at 15 and secured to member 12 to define closed eye elements at the rear corner portions of member 12. Connecting the respective eye elements 13 and 15 to the respective side chains 11 are the respective outwardly-divergent short chain elements 16 and 17.

The intermediate member 12 is provided at its forward side portion with the forward ground-engaging projections or calks 18, 18, and is similarly provided at its rear side portions with the ground-engaging calks 19, 19.

The anti-friction device is mounted on a tractor or truck wheel in the same manner as the conventional anti-skid chains. The horseshoe-shape of the intermediate members 12 of the device provides a wide bearing, and the calks 18 and 19 provide an efficient ground-gripping action, whereby traction is available even on very slippery surfaces, such as ice. The transverse bar members 14 prevent spreading of the horseshoes and insure that the side chains will be maintained substantially in parallel relation under load at all times, whereby undesired looseness of the anti-skid chain assembly will not develop after a long period of use of the device.

It will be further apparent that the horseshoes will not readily become clogged when the anti-skid chain assemblies are employed to provide traction for the vehicle wheels when traveling over loose material, such as sand, snow, or the like, and will provide positive gripping action on such material, unlike traction chains having flat traction elements.

While a specific embodiment of an anti-skid element for use on tractor tire chains has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In an anti-skid chain device of the character described, a pair of spaced side chains, an intermediate member in the form of a horseshoe, a plurality of ground-engaging projections carried by said intermediate member, a transverse bar member rigidly connecting the rear ends of the intermediate member and formed at its ends to define eye elements, additional eye elements secured to the forward side portions of said intermediate member, and respective short chains connecting the respective eye elements to the adjacent side chains.

WILLIAM F. LANGENFELD.

REFERENCES CITED

The following references are of record in the file of this patent:

UNITED STATES PATENTS

| Number | Name | Date |
|---|---|---|
| 1,053,504 | Harris | Feb. 18, 1913 |
| 1,357,334 | Mikulecky | Nov. 2, 1920 |
| 1,635,017 | Sunde | July 5, 1927 |
| 1,818,794 | Drager | Aug. 11, 1931 |
| 1,998,933 | Krisan | Apr. 23, 1935 |